United States Patent [19]

Kingston et al.

[11] Patent Number: 4,865,427
[45] Date of Patent: * Sep. 12, 1989

[54] SPATIAL LIGHT MODULATOR

[75] Inventors: Robert H. Kingston; Frederick J. Leonberger, both of Lexington, Mass.

[73] Assignee: Massachusetts Institute of Technology, Cambridge, Mass.

[*] Notice: The portion of the term of this patent subsequent to Sep. 29, 2004 has been disclaimed.

[21] Appl. No.: 82,852

[22] Filed: Aug. 6, 1987

Related U.S. Application Data

[62] Division of Ser. No. 224,140, Jan. 12, 1981, now Defensive Publication No. 4,696,533.

[51] Int. Cl.⁴ .......................... G02F 1/01; G02B 6/10
[52] U.S. Cl. .................................. 350/355; 350/392; 350/96.14
[58] Field of Search .................. 350/354–356, 350/392, 393, 96.14, 374, 380, 384, 386, 389

[56] References Cited

U.S. PATENT DOCUMENTS

| | | | |
|---|---|---|---|
| 3,748,597 | 7/1973 | Reinhart | 350/356 X |
| 3,842,372 | 10/1974 | Pao et al. | 350/356 X |
| 4,077,700 | 5/1978 | Camphausen | 350/96.13 |
| 4,094,606 | 7/1978 | Camphausen | 350/96.14 X |
| 4,099,250 | 7/1978 | Finnila et al. | 364/826 |
| 4,117,514 | 9/1978 | Terui et al. | 358/213 |
| 4,127,877 | 11/1978 | Morishita et al. | 358/213 |
| 4,163,239 | 7/1979 | Carter | 357/24 |
| 4,167,754 | 9/1979 | Nagumo | 358/167 |
| 4,168,444 | 9/1979 | VanSanten | 307/311 |
| 4,173,772 | 11/1979 | White | 358/213 |
| 4,174,528 | 11/1979 | White | 358/280 |
| 4,178,614 | 12/1979 | Sauer | 358/213 |
| 4,188,642 | 2/1980 | Morishita et al. | 358/213 |
| 4,190,851 | 2/1980 | Finnila | 357/30 |
| 4,193,093 | 3/1980 | St. Clair | 358/160 |
| 4,194,213 | 3/1980 | Kano et al. | 357/24 |
| 4,197,469 | 4/1980 | Cheung | 307/221 D |
| 4,206,372 | 6/1980 | Levine | 307/221 D |
| 4,213,137 | 7/1980 | Pines | 357/30 |
| 4,216,503 | 8/1980 | Wiggins | 358/280 |
| 4,217,611 | 8/1980 | Ogawa | 358/294 |
| 4,225,883 | 9/1980 | Van Atta et al. | 358/113 |
| 4,227,201 | 10/1980 | Grinberg | 357/24 |
| 4,228,365 | 10/1980 | Gutierrez et al. | 307/221 |
| 4,229,754 | 10/1980 | French | 357/30 |
| 4,231,052 | 10/1980 | Day et al. | 357/24 |
| 4,231,062 | 10/1980 | Stewich | 358/109 |
| 4,242,700 | 12/1980 | Weimer | 358/44 |
| 4,245,164 | 1/1981 | Funahashi | 307/221 D |
| 4,696,533 | 9/1987 | Kingston et al. | 350/96.14 |

OTHER PUBLICATIONS

"Spatial Light Modulators", D. Casasent, Proc. of the IEEE, vol. 65, No. 1, Jan. 1977, pp. 143–157.

"Comparison of Surface Acoustic Wave and Optical Signal Processing", R. C. Williamson, SPIE, vol. 185, Optical Processing Systems, 1979.

"Operations Achievable with Coherent Optical Information Processing Systems", J. W. Goodman, Proc. of the IEEE, vol. 65, No. 1, Jan. 1977, pp. 29–38.

"Integrated Optic Spectrum Analyzer", M. K. Barnoski et al., SPIE, vol. 209, Optical Processing for C³1, 1979.

"Wideband Real–Time Signal Processing Using Integrated Optics", C. S. Tsai, SPIE, vol. 209, Optical Signal Processing for C³1, 1979.

(List continued on next page.)

Primary Examiner—Eugene R. LaRoche
Assistant Examiner—Nathan W. McCutcheon
Attorney, Agent, or Firm—Robert F. O'Connell

[57] ABSTRACT

Spatial light modulators which use a substrate having a buried channel charge-coupled device (CCD) formed therein, wherein the amount of charge in the charge storage wells associated with the electrodes of the CCD is controlled by an electrically or optically addressed data signal. The level of charge in such charge storage wells controls the electric field beneath the electrodes so that the intensity of electromagnetic energy (e.g., light) directed through The CCD is spatially modulated by the charge levels in the charge storage wells in accordance with the Franz-Keldysh electroabsorption effect.

34 Claims, 5 Drawing Sheets

OTHER PUBLICATIONS

"GaAs and GaAls Devices for Integrated Optics", V. Evthuhov and A. Yariv, IEEE Transactions on Microwave Theory and Techniques, Jan. 1975.

"An Introduction to Integrated Optics", H. Kogelnik, IEEE Transactions on Microwave Theory and Techniques, vol. MIT-23, No. 1, Jan. 1975.

"Electroabsorption in GaAs and its Application to Waveguide Detectors and Modulators", G. E. Stillman et al., Applied Physics Letters, vol. 28, No. 9, 5/1/76.

"Wide Bandwidth Liquid Crystal Light Valve", P. Braatz et al., Final Report Contract DAAK70-7-8-C-0100, Defense Advance Research Projects Agency, May 1979.

SPATIAL LIGHT MODULATOR

The Government has rights in this invention pursuant to Contract Number F19628-80-C-0002 awarded by the Department of the Air Force.

This is a divisional of co-pending application Ser. No. 224,140, filed on Jan. 12, 1981, now U.S. Pat. No. 4,696,533.

INTRODUCTION

This invention relates generally to spatial light modulators and, more particularly, to semiconductor spatial light modulators using buried channel charge-coupled devices wherein control of the charges in the wells thereof permits control of the intensity of an electromagnetic wave transmitted therethrough.

BACKGROUND OF THE INVENTION

Devices for controlling the spatial distribution of the intensity of electromagnetic waves, such as light, are often designated as spatial light modulators (SLM's). Such devices which can be used in processing data are capable of spatially modulating a collimated coherent or incoherent beam of light with, for example, input data which is to be processed. The devices are appropriately coupled to optical data processing systems into which the data modulated light beam is supplied at a rate commensurate with the processing system's potential throughput, the optical processing system utilizing parallel processing without the limitations normally imposed by serial manipulation of the data.

Many different forms of spatial light modulators have been suggested by those in the art. A recent article, entitled "Spatial Light Modulators", by David Casasent and published in the Proceedings of the IEEE, Vol. 65, No. 1, January 1977, at pages 143-157, provides a summary of various types of spatial light modulators that have been suggested by the art. The devices described therein include SLM's using liquid crystal materials; materials which undergo surface deformation patterns (sometimes referred to as deformable SLM's), i.e., thermoplastic materials, dielectric oils, ruticon, or elastomers, or membranes combined with surface channel charged coupled devices (CCD's); alkali halide materials having intentionally introduced color center defects (sometimes referred to as photodichroic SLM's); materials which exhibit the Pockels effect (sometimes referred to as Pockels SLM's); materials using ferroelectric-photoconductor characteristics; materials using ferroelectric-photorefractive characteristics; and SLM's using acousto-optic techniques, magneto-optic techniques, techniques utilizing the characteristics of amorphous semiconductor materials; and techniques using magnetic-bubble devices.

In most cases, however, the above devices are only optically addressable by using a scanning light beam, for example, or electron beam addressable by using a scanning electron beam. Such devices are cumbersome and expensive to fabricate and are slow in operation. Of the relatively few types of devices which are electrically addressable, such as devices which use membranes deflected by electrical signals which are supplied through electrodes in contact with the membrane or devices which use membranes combined with charged coupled devices, the structure thereof is extremely difficult to fabricate and the membrane response is relatively slow so that such devices are not readily usable for high speed, real-time processing operations.

It is desirable, therefore, to devise spatial light modulators which can be fabricated with much less difficulty and at much less cost and which can operate at high speeds utilizing electrically or optically addressable input data.

BRIEF SUMMARY OF THE INVENTION

This invention provides spatial light modulators which operate in real time and which are primarily, and often preferably, electrically addressable or, alternatively, are optically addressable. Such spatial light modulators can be fabricated using known techniques so as to produce a relatively compact device handling a relatively large amount of input data in a relatively small volume, the device being such as to be capable of operation at high speeds, using up to as high as $10^9$ data samples per second. The basic spatial light modulator device of the invention can be used with other elements, such as lenses and any appropriate light detection devices, to perform such functions as cross-correlation, convolution, matched filtering, Fourier transformations, and the like. The device utilizes a suitable substrate having a "buried channel" charge-coupled device (CCD), sometimes referred to as a "bulk channel" or "peristaltic" CCD, formed at a surface of the substrate. The amount of charge in the charge storage wells associated with a plurality of electrodes of the buried channel CCD is controlled by an electrically or optically addressed data signal. The level of charge in such charge storage wells thereby controls the electric field beneath the electrodes such that the transmitted light is spatially modulated by the charge levels in the charge storage wells in accordance with the Franz-Keldysh electro-absorption effect.

DESCRIPTION OF THE INVENTION

The invention can be described in more detail with the help of the accompanying drawing wherein.

Figure 1:
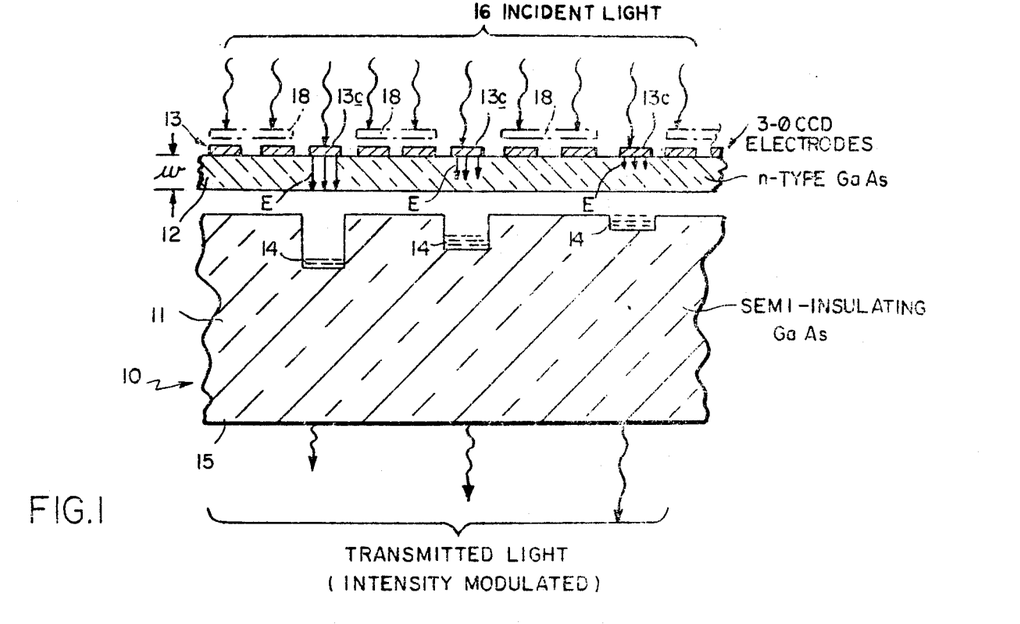
FIG. 1 shows a view in section of a portion of the device of the invention.

FIG. 1 depicts in diagrammatic form a charge-coupled-device (CCD) array of the "buried channel" type to illustrate the operation of the invention. As shown therein a substrate 10 comprises a semi-insulating region 11 of gallium arsenide (GaAs) and an epitaxially grown n-type GaAs region 12 having a thickness, w, the latter region being generally at the surface of the overall substrate but having a sufficient depth to provide for the buried channel CCD operation. The n-type GaAs layer 12, for example, may have a doping density of $10^{15}$ to $10^{16}$/cc.

A plurality of CCD electrodes 13 forming a plurality of Schottky barrier diodes are deposited on layer 12 as shown. Such electrodes, shown diagrammatically in FIG. 1 for a three-phase (3-0) device, are representative of the electrodes required for well-known CCD buried channel devices operating with any number of phases. One of the electrodes 13C of each 3-0 group thereof has a charge storage well capable of storing charges therein, the number of charges being dependent on the signal level introduced at the input electrode. Such devices, for example, are described in the textbook "Charge Transfer Devices" by Carlo H. Sequin and Michael F. Tompsett, Bell Telephone Laboratories, Academic Press, Inc., New York, New York, 1975.

Figure 1A:
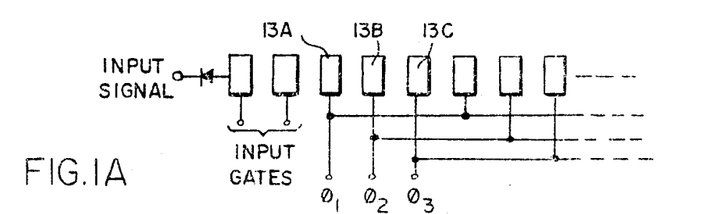
FIG. 1A shows a diagrammatic view of an input circuit useful with the device of FIG. 1.

Charges can be placed in the charge storage wells 14 associated with each of the CCD electrodes 13C, as is well known to those in the art, by clocking in a suitable electrical signal utilizing appropriate input circuitry conventionally known to the art. An exemplary input circuit is shown in FIG. 1A, wherein CCD electrodes 13A, 13B, . . . etc., correspond to the electrodes 13 shown in FIG. 1. An input signal is supplied at an input terminal via a diode, the input data being serially clocked by appropriate clock signals applied at the input gates so that such input data is clocked into the three electrodes, of the first group thereof, i.e., into electrode 13A, thence into electrode 13B, thence into electrode 13C, thence into the electrodes 13A, 13B and 13C of the next group thereof, . . . etc., such electrodes having appropriate clock phase gating signals $0_1$, $0_2$ and $0_3$ applied thereto as shown. Such a serial clocking process and the exemplary circuitry shown are well known to the art.

The charge storage wells 14 are depicted only diagrammatically to illustrate the principles of operation. The charges in the storage wells 14 of the CCD device produce electric fields (shown by vectors E) within the buried channel of the n-type GaAs region 12 beneath the electrode 13C associated with each well. The strengths of the electric fields are depicted by the lengths of vectors E, such strengths being determined by the amount of charge in the associated well. Thus, the greater the amount of charge in a well, the less the epitaxial layer is depleted and the lower the electric field strength in the region 12.

An analog input signal, for example, which is clocked into the CCD devices is thereby effectively represented in amplitude by the varying charges which are placed in the storage wells 14 of the associated CCD electrodes 13C, the resolution thereof depending on the number of such electrodes used. In a typical device, for example, 1000 CCD 3-0 electrode groups (of which only three are fully depicted in FIG. 1) may be used to represent the analog signal which has been clocked in.

In accordance with the invention, incident light, represented by wavy lines 16, at an appropriately selected wavelength, having a uniform amplitude, can be directed to the surface of the substrate on which the CCD electrodes 13C are placed. The electrodes 13C are in the form of very thin layers of metal, the thicknesses thereof being such as to be effectively transparent to the incident light so as to transmit the light therethrough. The GaAs layer 12 and the semi-insulating GaAs regions are effectively transparent to the light and thereby also transmit the incident light therethrough. It has been found in accordance with the invention that the amount of charge in the CCD storage wells 14 and, the associated electric field strengths determines the amount of incident light which can be transmitted through the n-type GaAs CCD buried channel region 12, in accordance with the Franz-Keldysh, or electroabsorption, effect. As used herein, the terms "Franz-Keldysh effect" and "electroabsorption effect" are used interchangeably. The magnitude of the transmitted light increases with a decrease in such electric field strengths. Hence, the light emitted from the opposite surface 15 of substrate 10 is amplitude modulated by the charge associated with the storage wells 14 of the CCD buried channel device.

Although in some embodiments it may not be necessary, it is preferred that the spatial light modulator of the invention be permitted to transmit the incident light only through the electrodes 13C associated with the storage wells 14 (transmission through the other electrodes produces no signal-controlled modulation). Such operation can be achieved by using appropriate masks, or light-opaque, element 18 between the incident light and those electrodes not associated with storage wells 14. Alternatively, the latter electrodes themselves may be formed of light opaque material. Other masking techniques for such purpose will also occur to those in the art.

Figure 2:
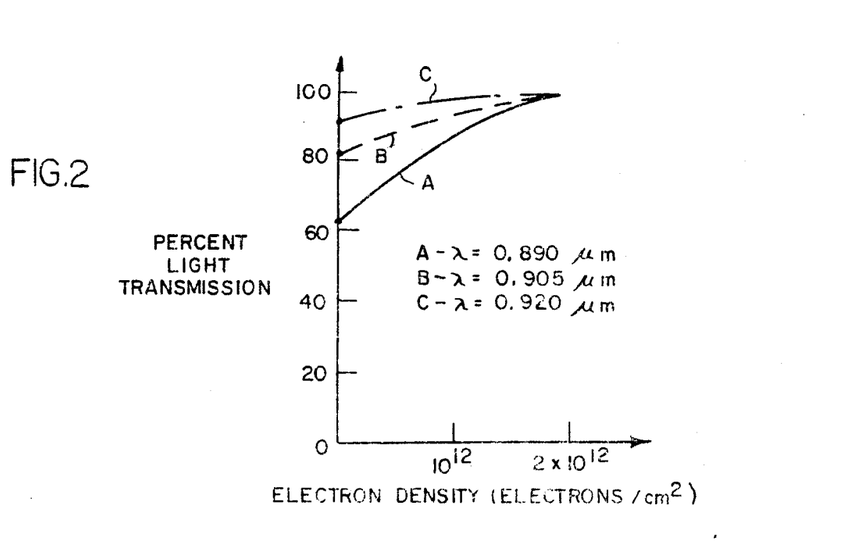
FIG. 2 shows a graph useful in explaining the operation of the device of FIG. 1.

FIG. 2 depicts in graphical form the light transmission characteristics of a typical device of the type shown in FIG. 1. Thus, the curves therein show the percentage of light transmitted for different wavelengths thereof as a function of the electron density (i.e., as a function of the charge in the storage wells 14). The solid curve A represents the percent transmission for light having a wavelength, $\lambda$, of 0.890 micrometers ($\mu$m.), the dashed curve B for $\lambda=0.905$ $\mu$m., and the dot-dashed curve C for $\lambda=0.920$ $\mu$m. For the exemplary curves of FIG. 2, the doping density, $N_D$, is $5\times 10^{15}$/cm., the thickness, w, of the n-type GaAs layer 12 is 4 $\mu$m, and the electrode voltage is 50 volts.

As can be seen in FIG. 2, as the electron density increases (i.e., the charge in the storage wells increases), the amount of light transmitted increases. Thus, at high charge levels substantially all of the input light is transmitted, while at low or substantially zero charge levels, a minimum amount of input light is transmitted.

Although the characteristics of the device, discussed above in FIG. 2, relate to the use of incident light of a relatively highly coherent nature, the device is not limited in its operative effect to coherent light but will produce a substantially similar effect even for light having a relatively low coherence. In some applications, as discussed below, it is desirable to use substantially coherent light while in other applications the use of highly coherent light may not be required.

When the input data, i.e., the input signal used to charge the storage wells 14, is clocked into the CCD device at relatively high rates, e.g., as high as $10^9$ data samples per second, the device is thereby referred to as electrically addressable. By utilizing such a device, therefore, the rate at which light modulated data can be made available to an optical processor is very high and the device of FIG. 1 can be used effectively with high speed optical processing systems.

Further, the particular embodiment of the device of FIGS. 1 and 2 uses a layer of n-type gallium arsenide of a particular preselected thickness W and a particular preselected doping density $N_D$. Operative devices, for example, can be made wherein such layers preferably utilize a thickness within a range from about 1 $\mu$m. to about 5 $\mu$m., doping densities within a range from about $10^{15}$/cm.$^3$ to about $10^{16}$/cm.$^3$, and electrode voltages from about 5 to 50 volts.

Additionally, the substrate 11 may also be p-type GaAs, as well known in the art, or alternatively it may be any form of insulating material yielding "buried channel" CCD operation.

Moreover, although gallium arsenide can be used for the substrate 11 and active layer 12, any other materials which exhibit the Franz-Keldysh electroabsorption effect can also be utilized. Such materials can include, for example, mercury-cadmium-telluride (HgCdTe) material and indium antimonide (InSb) material.

The spatial light modulator of FIG. 1 can be used in a variety of applications in which amplitude modulation of incident light is required. Several significant applications in which such a device can be successfully used are discussed below with reference to FIGS. 3 through 8.

Figure 3:
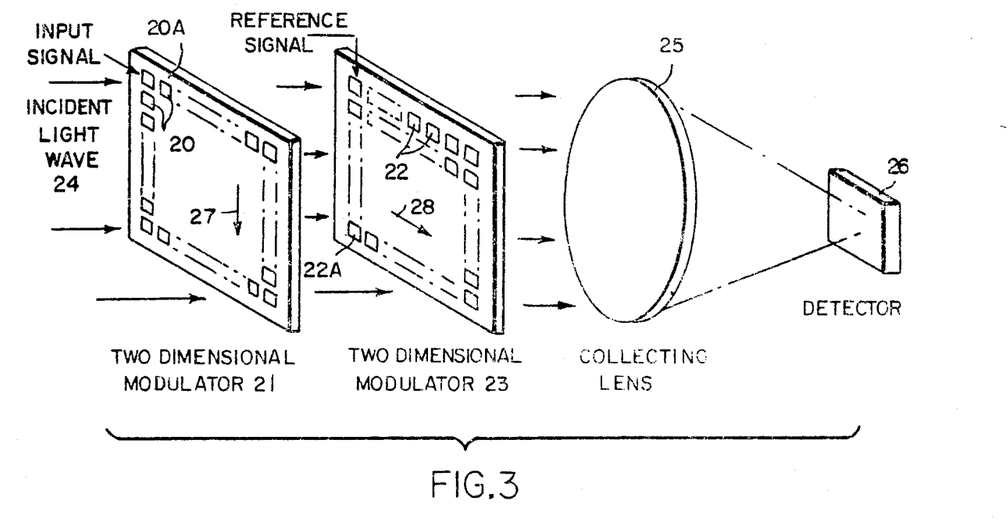
FIG. 3 shows a system utilizing the device of FIG. 1 for performing correlation operations.
Figures 3A, 3B, 4:
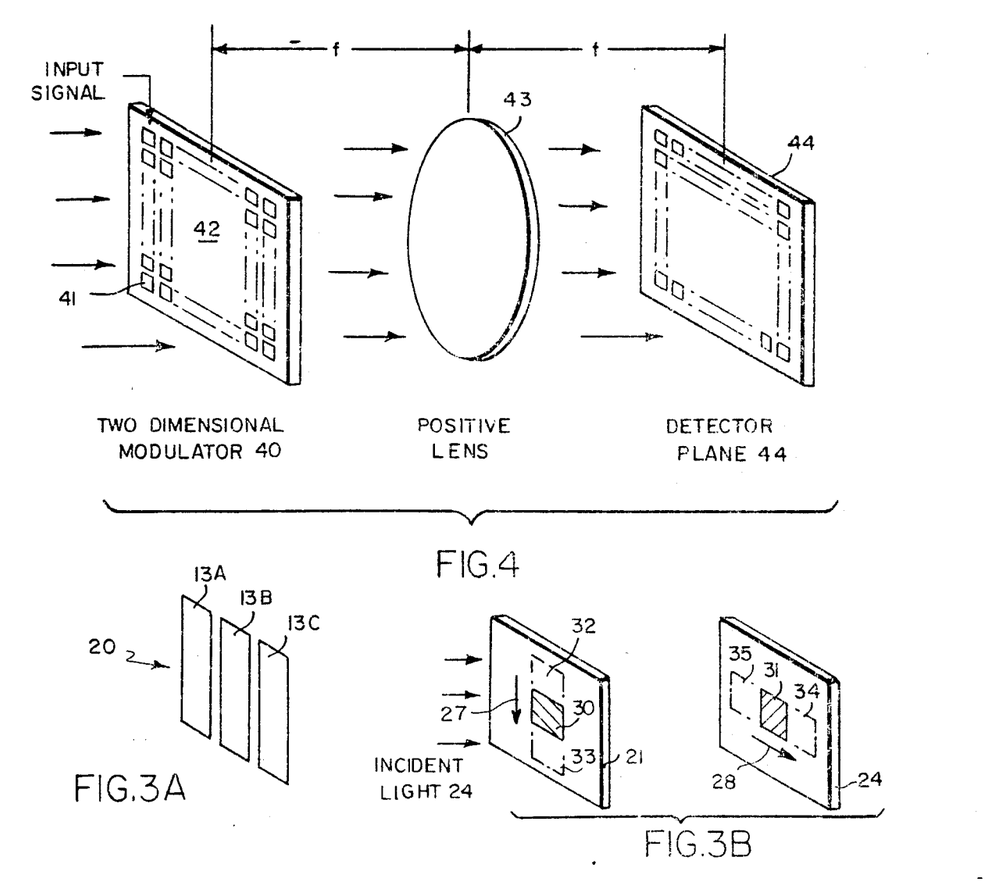
FIG. 3A shows a diagrammatic view of a portion of the modulator devices of FIG. 3.
FIG. 3B shows a diagrammatic view of an alternative arrangement of the modulator devices of FIG. 3.
FIG. 4 shows the device of FIG. 1 as used in a configuration for performing Fourier transform operations.

FIG. 3 depicts a system using devices of the type discussed with reference to FIG. 1. In FIG. 1, for simplicity in explaining the operation of the invention, the CCD electrodes are arranged in an effective one-dimensional configuration, all of the electrodes being spaced along a single line at the optical input surface. In FIG. 3, the CCD electrodes 20 are arranged in a two-dimensional array on the optical input surface of a substrate 21. Each electrode region 20, as shown therein, is intended to represent a plurality of specific CCD electrodes, the number of which depends on whether a two-phase, three-phase or four-phase CCD device, for example, is used. Thus, the enlarged portion of an exemplary one of such regions, 20, as shown in FIG. 3A, depicts a three-phase arrangement of CCD electrodes 13A, 13B and 13C similar to that depicted in the one-dimensional embodiment of FIG. 1.

A second two-dimensional array of CCD electrode regions 22 is similarly arranged on the optical input surface of a substrate 23.

The operation of the two-dimensional modulator structures on substrates 21 and 23 of FIG. 3 is effectively the same as that of FIG. 1. Thus, a two-dimensional input light wave 24, incident upon the optical input surface of substrate 20, for example, is appropriately spatially modulated in a two-dimensional manner by the charge levels in the active charge storage wells of the CCD electrode array in accordance with the Franz-Keldysh electroabsorption effect to produce a two-dimensional, spatially modulated image at the optical output surface thereof.

The charges in the wells of the CCD array 20 of FIG. 3, for example, are effectively clocked into the CCD electrodes in a manner well known to those in the art, as discussed above with reference to FIG. 1. Thus, in a particular embodiment, for example, a modulating input signal is serially clocked into the first row 20A of the CCD array through well-known input circuitry as discussed above. When such signal has been clocked into the first row of electrodes, such signal can then be clocked in parallel vertically to the adjacent row of electrodes also in a manner well known to the art. The next successive modulating input signal portion is then clocked into the first row. The signal in each row is then clocked in parallel to its next adjacent row until all of the rows of the CCD array are "filled" and the overall array comprises storage charge wells which are charged in accordance with the overall or total two-dimensional input modulating signal which has been so entered into the electrode array. The clocking of such signals can be compared analogously to the clocking of signals into a series-parallel array of storage registers wherein a signal is serially clocked into a first register and is then shifted in parallel to the adjacent register, and so on, until all of the registers have a signal clocked into them.

The general configuration shown in FIG. 3, using one-dimensional structures, has been used by those in the art with other elements to provide for signal correlation, either for the cross-correlation of two input signals or for the convolution of two input signals. Such a general configuration is shown and discussed, for example, in the article "Comparison of Surface Acoustic-Wave and Optical Signal Processing", by R. C. Williamson, Society of Photo-Optical Instrumentation Engineers, Vol. 185, Optical Processing Systems, 1979. In the Williamson article, with reference to FIG. 14 thereof, the author discusses such a general optical convolver configuration using a pair of Bragg cells together with a collecting lens, the convolved signals from the Bragg cells being appropriately summed in a suitable detector. The convolution process occurs, for example, between an input signal applied at one end of one Bragg cell and a reference signal applied at the opposite end of a second Bragg cell adjacent thereto. In a similar manner, as would be known to the art, cross-correlation between the applied signals would occur if they are applied at the same ends of the Bragg cells.

In the embodiment of FIG. 3 of the invention, the one-dimensional Bragg cells shown in the Williamson article are replaced by the unique two-dimensional spatial light modulator devices of the type shown in FIG. 1 utilized in conjunction with a suitable collecting lens 25 and optical detector 26, the latter two being of a type similarly shown and discussed in the Williamson article.

An input signal is clocked serially into the first row 20A of CCD electrodes of the two-dimensional spatial light modulator electrode array 20, such signal then being shifted or clocked in parallel to the next row of CCD electrodes, the next input signal being then serially clocked into the first row. Such process continues until a plurality of such input signals has been clocked into the entire CCD array. A reference signal can be applied in the same manner to the first column 22A of two-dimensional spatial light modulator electrodes 22 of substrate 23, with the total reference image filling the CCD array by horizontal sequential shifts.

Incident light is applied to the input optical surface of spatial light modulator 21 and the modulated light from the optical output surface of modulator 23 yields an output wave at each position of the two-dimensional image which is proportional to the local product of the signal and reference waves. Such signal is appropriately collected by collecting lens 25 and summed in a suitable detector 26, as discussed above.

In order to produce a cross-correlation output of the input signal as clocked into CCD electrode array 20 and the reference signal clocked into CCD electrode array 22, the signals must be appropriately shifted relative to each other during the cross-correlation processing operation.

In a simple one-dimensional array configuration, e.g., where only a single column of CCD electrodes is used in each of the spatial light modulators, for example, the reference wave can be clocked into a single column of CCD electrodes in modulator 23 and, once fully clocked therein, the modulating input signal is then clocked into a single column of electrodes of modulator 21 while the incident light is directed to the optical input surfaces thereof. As the modulating input signal is clocked into the one-dimensional column of electrodes of modulator 21, it effectively shifts relative to the stored reference signal in the one-dimensional column of modulator 23 (which, once it is clocked, remains effectively stationary) and the cross-correlation output of the two signals is provided by the lens and detector combination of the overall configuration. If the reference signal is originally clocked into the opposite end of the CCD column of electrodes in modulator 23, a convolution output of the input and reference signals is obtained. Alternatively, the modulating input and reference signals may be clocked simultaneously into opposite ends of their respective single electrode columns while the incident light is applied thereto in order to obtain the convolution output.

In the two-dimensional configuration shown in FIG. 3, the modulating and reference signals also must be shifted relative to each other in an appropriate manner. In one suggested technique, for example, both the input and the reference signal can be clocked into CCD electrode arrays 20 and 22, respectively, in the series-parallel fashion discussed above until the complete signals are clocked into each of the electrode arrans. Each of the arrays then represents a two-dimensional signal, the correlation of which is to be obtained.

For such purpose, each of the signals can be appropriately clocked in a parallel fashion in orthogonal directions relative to each other. Thus, the two-dimensional signal in array 20 can be clocked in one direction as shown by arrow 27 while the reference signal in array 22 can be clocked in the orthogonal direction shown by arrow 28. For such purpose in order to avoid clocking the signals out of the array, the overall array can be made so as to be greater in its overall dimension than the dimension of the two-dimensional signal which is clocked into them. Thus, the signals can be stored originally only in a central region of each array as shown diagrammatically in FIG. 3B, the arrays including CCD electrode regions at either side of the central regions 30 and 31, which when the input and reference signals are clocked therein leaves regions 32 and 33 on either side of region 30 in modulator 21 and regions 34 and 35 on either side of the central region 31 of modulator 23.

Once the signals are so arranged in the central regions 30 and 31 of modulators 21 and 23, respectively, they can be further shifted in parallel in respective directions 27 and 28 using known techniques so that when they have been completely shifted relative to one another into regions 32 and 34, respectively, while incident light 24 is applied to the optical input surfaces thereof, a correlation output is obtained at the lens and detector output elements of the overall configuration.

While the configuration of the prior art using Bragg cells, for example, as shown in the aforementioned Williamson article, can provide a cross-correlation (or convolution) operation, this previously suggested techniques provide only one-dimensional processing of the data. The system of the invention using spatial light modulators of the type discussed with reference to FIG. 1, as shown in FIG. 3, however, provides processing for two-dimensional data fields containing 100 to 1000 times as many resolution elements or data samples.

In a similar manner, the spatial light modulator device of the invention can be used to provide for Fourier transform processing of an input signal. Optical configurations for providing Fourier transform operation are also discussed in the aforesaid Williamson article, with reference, for example, to the concept of FIG. 6 thereof, as well as in the article "Operations Achievable with Coherent Optical Information Processing Systems" by J. W. Goodman, Proceedings of the IEEE, Vol. 65, No. 1, January 1977 (with reference, for example, to FIGS. 2 and 3 thereof). In such configurations the signal to be processed is normally stored as an image in a thin film, for example.

A general configuration of the type shown in such articles is depicted in FIG. 4 in which the thin film device is replaced by a two-dimensional spatial light modulator 40 of the type discussed with reference to FIG. 1, which modulator is used to provide an input signal array by suitable serial-parallel clocking techniques in substantially the same manner discussed above with reference to FIG. 3. The incident light applied to the optical input surface 41 of the spatial light modulator 40 is modulated by the two-dimensional signal stored in the charge storage wells of the CCD electrode array 42. The modulated two-dimensional output spatial light image is transmitted through positive lens 43 and subsequently detected at detector plane 44 to produce the Fourier transform of the input signal. The detector array and positive lens combination is well known to the art as is discussed in the Williamson and Goodman articles.

The distance between the elements is equal to the focal length f of the lens 43.

Figure 5:
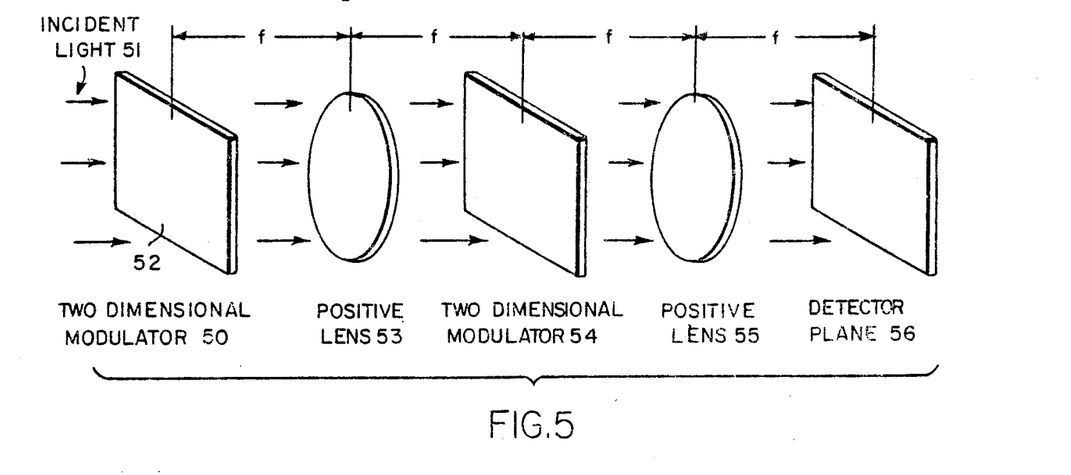
FIG. 5 shows a device of FIG. 1 used in a configuration for performing matched filtering operations.

In the Williamson and Goodman articles, the authors also discuss configurations for providing matched filter operations as shown in FIG. 8 of Williamson and in FIG. 4 of Goodman. The spatial light modulator of the invention herein again can be used to provide such operation as depicted in FIG. 5. As shown, a spatial light modulator 50 of the types discussed above in FIGS. 1, 3 and 4 has input data applied thereto to form a two-dimensional array thereof. Incident light 51 applied to the optical input surface 52 of spatial light modulator 50 is then modulated by the charges in the storage wells which are proportional to the data supplied to the CCD array and transmitted through lens 53. Such operation produces the Fourier transform of the input data as discussed above. The data is then further modulated by a reference signal data array which has been applied to a second spatial light modulator 54 of the same type as modulator 50, the modulation process effectively providing a multiplication of the Fourier transform of the data signal input by the reference data. The modulated output of spatial light modulator 54 is then transmitted through a second lens 55 which effectively produces the inverse Fourier transform thereof for detection at detector array plane 56. Such overall operation provides the matched filter processing desired.

Each of the above configurations of FIGS. 3, 4 and 5 is depicted as performing the desired operations with two-dimensional data arrays. It is clear, however, that such operations can also be performed for one-dimensional data signals wherein each spatial light modulator utilizes only a single row of CCD electrodes rather than the two-dimensional array of electrodes as shown, the necessary input and/or reference signals being serially clocked into and/or retained in each of such rows, as appropriate for modulating the light input transmitted therethrough. In this way correlation, Fourier transform processing, and matched filtering operations can be achieved for one-dimensional spatial input signals.

Further, in the embodiments discussed above, an alternative method of light modulation may be used in which the incident light wave is incident on the surface of the substrate opposite to that on which the electrodes are formed, i.e., on the back surface 15 in FIG. 1, for example, the electrodes 13 then being arranged to be totally reflecting. In such case, the radiation passes twice through the absorbing region 12 and returns for transmission to and through surface 15 with the appropriate intensity modulation. The fabrication of structures using such reflective mode of operation is well known in the art (as described, for example, in the previously cited Casasent paper) and such reflective techniques can be readily applied to the embodiments of the invention as described herein.

In the above configurations of FIGS. 1–5 the concept of spatially modulating coherent or incoherent lights, as appropriate, by the spatial light modulators of the invention is discussed as being provided by applying the incident light to the modulator in a direction substantially perpendicular to the planes of the electrodes of the charge-coupled device. Spatial light modulation, however, can also be achieved in accordance with the invention by applying the incident light wave in a direction substantially parallel with such plane, the light, for example, being effectively directed in a particular embodiment toward an edge of the modulator device.

Figure 6:
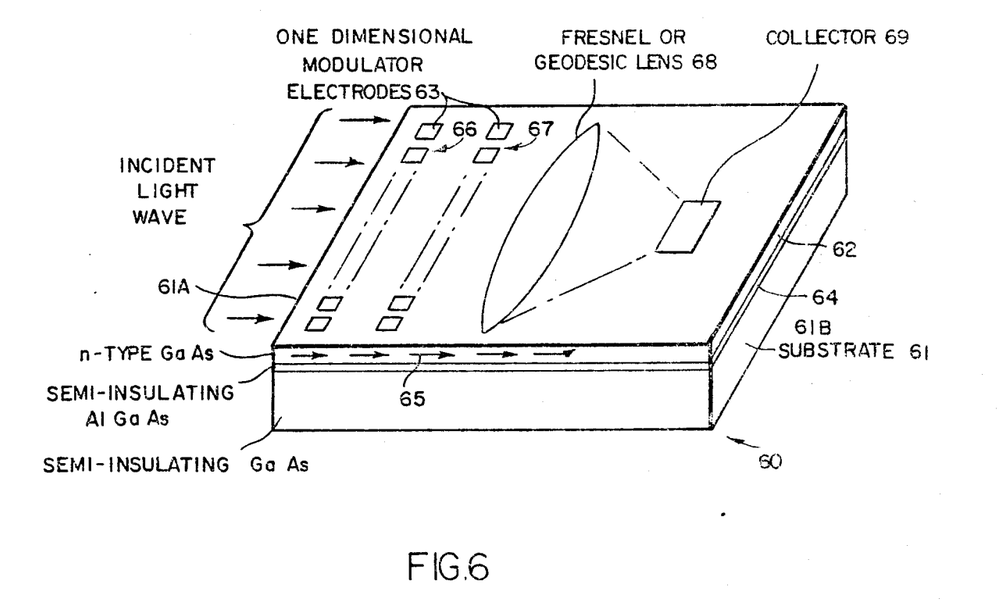
FIG. 6 shows the device of FIG. 1 used in an alternative embodiment of a configuration for performing Fourier transform operations.

Devices of the latter type are shown in FIG. 6 in which a correlator 60 comprises a substrate 61 which may be of the form of a semi-insulating GaAs material, as discussed above. The upper layer 62 on which the CCD electrodes 63 are positioned is formed as a layer of n-type GaAs material, as in the previously discussed spatial light modulator structures. However, in order to guide the incident light signal wave along a direction parallel to the surface 62, an intermediate semi-insulating aluminum gallium arsenide (AlGaAs) layer 64 is placed below and adjacent to the n-type GaAs layer between the latter layer and the bulk of the substrate. The properties of such intermediate layer 64 are such as to provide an effective guiding of the incident light wave so that it travels from an input surface edge 61A to an output surface edge 61B within the region formed by the n-type layer 62, as shown by the arrows 65. Other techniques are known to the art for providing such a wave guiding operation within the n-type layer of the substrate, various techniques for producing guided waves in substrates being discussed, for example, in the following articles: "An Introduction to Integrated Optics", H. Kogelnik, IEEE Transactions on Microwave Theory and Techniques, Vol. MTT-23 No. 1 January 1975; "GaAs and GaAlAs Devices for Integrated Optics", V. Evtuhov et al., IEEE Transactions on Microwave Theory and Techniques, Vol. MTT-23, No. 1, January 1975.

In the configuration shown in FIG. 6, a pair of separate rows of buried channel charge-coupled devices 66 and 67 are formed adjacent each other, as shown, such CCD's forming suitable one-dimensional modulators in the same manner as discussed above with reference to FIG. 1, for example. A Fresnel or geodesic lens, for example, is formed in the surface of the n-type gallium arsenide layer 62, techniques for forming such lens being well known to those in the art as shown by the articles: "Wideband Real-Time Signal Processing Using Integrated Optics", C. S. Tsai, SPIE Vol. 209, Optical Signal Processing for $C^3 1$ (1979); and "Integrated Optic Spectrum Analyzer", M. K. Barnoski et al., SPIE Vol. 209, Optical Signal Processing for $C^3 1$ (1979). A suitable collector 69 is also formed, using well-known techniques, on such surface, as shown. An incident input light wave 70 is applied in a direction substantially parallel to the plane of electrodes 63 at the edge 61A of the substrate, the signal wave being appropriately guided through the layer 62, as shown by arrows 65. The transmission properties of the guided wave are modulated by the charge levels in the storage wells of the buried channel CCD's 66 and 67 in accordance with the Franz-Keldysh electroabsorption effect. The guided wave configuration shown in FIG. 6 is substantially analogous to that discussed with reference to FIG. 3 and can provide for appropriate correlation of an input signal with a reference signal. Thus, a reference signal can be clocked serially into the electrodes of CCD 67 and, once such clocking has been completed, an input signal can be similarly serially clocked into the electrodes of CCD 66, the latter signal thereby being shifted relative to the reference signal retained in modulator 67 as such input signal is clocked therealong. During such operation the incident light wave applied to edge 61A and guided through n-type layer 62 is thereby modulated by the correlated output of the input and reference signals, which modulated signal is collected by collecting lens 68 and subsequently detected at electrode detector 69 so as to provide the cross-correlation output of the input and reference signals. If the input signal and the reference signal are applied at opposite ends of their respective one-dimensional CCD modulator rows, the output signal detected at detector 69 represents the convolution of the input and reference signals.

Figure 7:
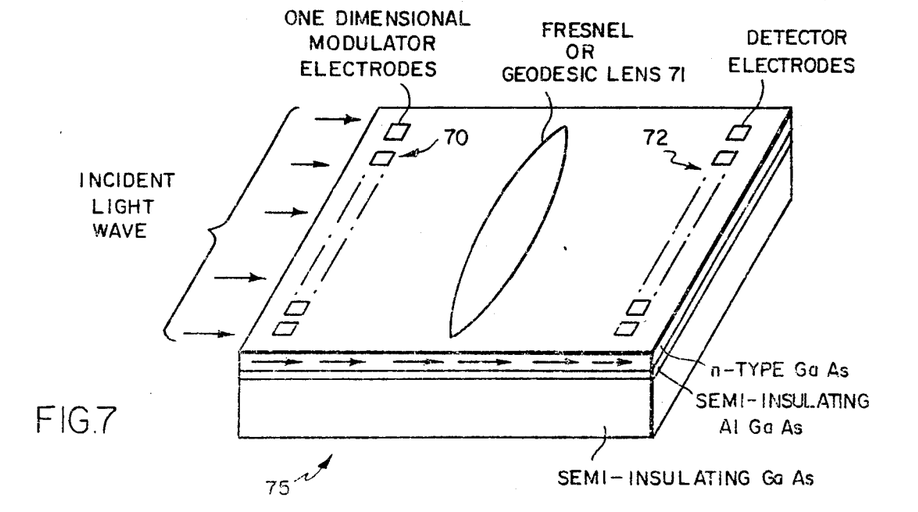
FIG. 7 shows a device of FIG. 1 used in an alternative embodiment of a configuration for performing correlation operations.

In a similar manner Fourier transform processing of an input signal can be achieved in a structure 75 such as that shown in FIG. 7 wherein a signal in a single one-dimensional CCD modulator 70 is utilized to modulate a guided incident light wave which is thereupon supplied to a Fresnel or a geodesic lens 71 and, thence, to a row of detector electrodes 72 to produce a Fourier transform output of the input signal to modulator 70.

Figure 8:
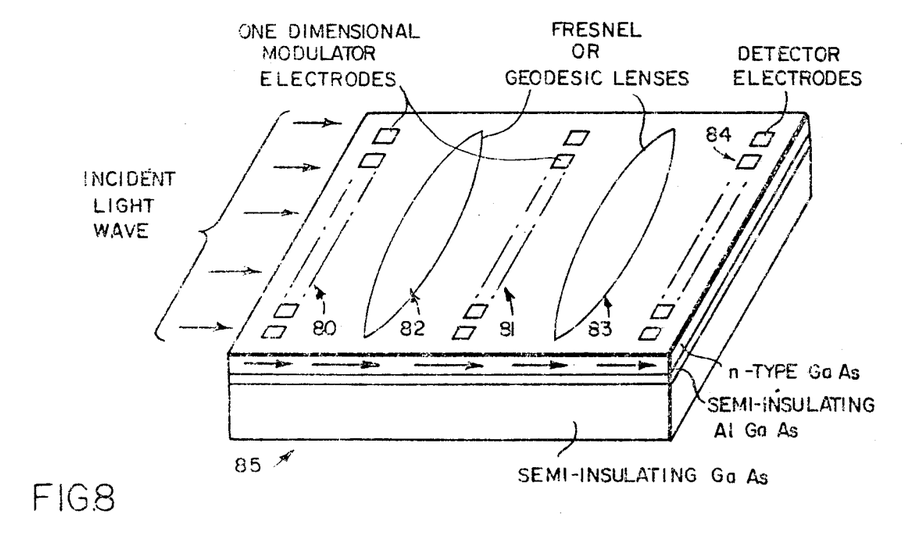
FIG. 8 shows a device of FIG. 1 used in an alternative embodiment of a configuration for performing matched filter operations.

In the structure 85 of FIG. 8 the one-dimensional modulator structures 80 and 81, the lens structures 82 and 83, and the detector electrodes 84 provide suitable match filtering operation in a manner analogous to that of FIG. 5 using a guided incident light wave as discussed above.

Figure 9:
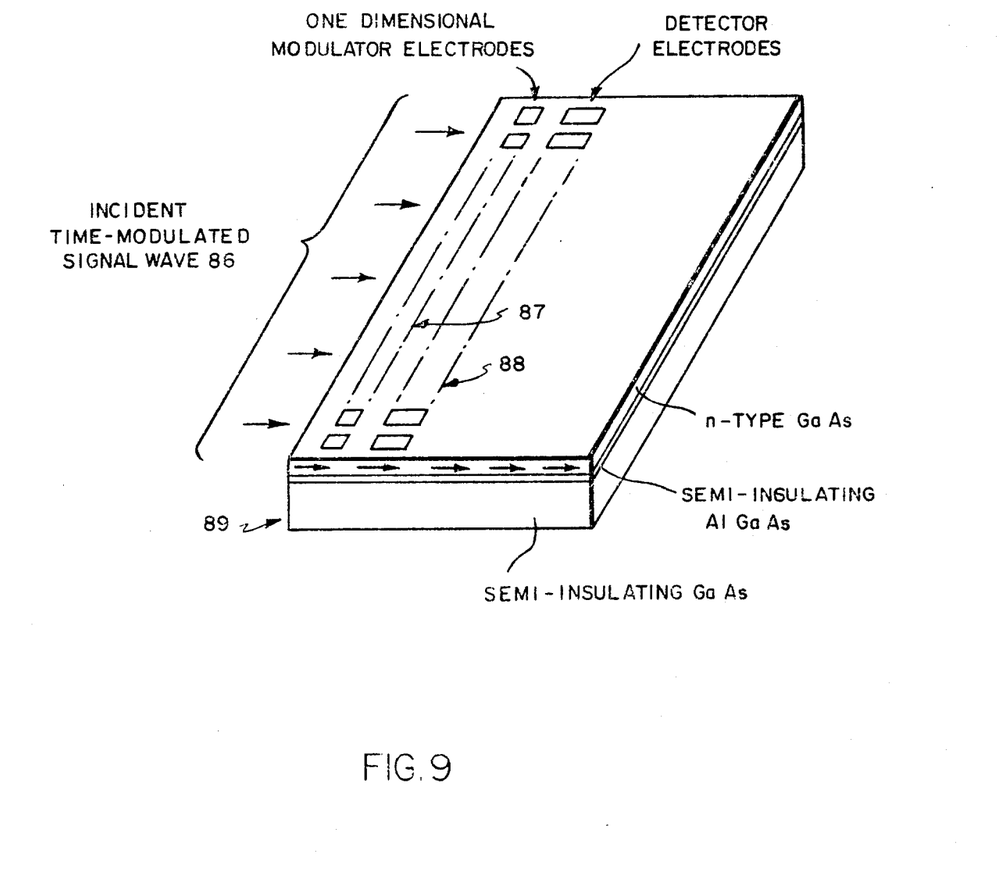
FIG. 9 shows a device of FIG. 1 used in an alternative embodiment of a configuration for performing time-integrating correlation.

In the structure 89 of FIG. 9, the incident light wave 86 may be modulated by an input signal and a reference waveform applied to the modulator electrodes 87. The utilization of detector array 88 for readout results in a time-integrating correlator, as described in the aforementioned Williamson article, with reference to FIG. 15 thereof. While the embodiment shown in FIG. 9 depicts the incident modulated wave as applied in a direction substantially parallel with the plane of the CCD electrodes (in a manner similar to the embodiments of FIGS. 6–8), it is clear that the incident modulated wave can be applied in a direction substantially perpendicular to such plane (in a manner similar to the embodiments of FIGS. 1 and 3–5).

Thus, the spatial light modulator device of the invention, formed either in a one-dimensional or a two-dimensional configuration, can be used to modulate an incoming light wave, whether the incoming light wave is supplied in a direction perpendicular to the plane of the CCD electrodes of such modulators, as in FIGS. 1 through 5, or in a direction parallel to the plane of the CCD electrodes and suitably guided within the n-type layer, as in FIGS. 6 through 8. Moreover, signals which are applied to the modulators can be appropriately shifted within a modulator array so as to move the charges in the storage wells thereof in one or more selected directions through appropriate serial and/or parallel clocking techniques of the signals applied to the electrodes thereof.

In all of the embodiments discussed above, the desired charge distribution in the CCD arrays is produced by an electrical input signal applied to the electrodes (i.e., an electrically addressable input). However, the desired charge distribution may be alternatively produced by using an optical input signal. For example, such operation may be accomplished by scanning a light beam over or along the electrode array, such light beam being temporally modulated to produce the desired local charge distribution. As a further optical alternative, a focused two-dimensional image of the radiation, such as in a camera focal plane, may produce the appropriate charge distribution as would be well known in the use of CCD array devices for image sensing. In accordance with the latter technique of optically addressing a CCD array, the writing image radiation may be at any or all wavelengths shorter than the so-called "cut-off" wavelength of the CCD semiconductor material. The cut-off wavelength in the case of gallium arsenide, for example, is 0.88 μmeters. After the impression of the charge distribution has been achieved by such optical technique, the pattern or waveform of charge distribution in the device may be shifted, if desired, throughout the structure by the well-known clocking techniques described above.

Further, the modulators of the invention can be arranged with various other lens and detector devices to perform various processing operations such as correlation, Fourier transform processing and matched filtering operation. Other applications will occur to those in the art utilizing the modulator devices of the invention within the scope of the invention.

Hence, the invention is not to be construed as limited to the specific embodiments shown and discussed above, except as defined by the appended claims.

What is claimed is:

1. An electro-optical system which includes a spatial light modulator comprising
   a substrate;
   a multi-phase charge-coupled device formed in a layer at a selected surface of said substrate, said layer having a plurality of electrodes each having a charge storage well associated therewith;
   means for supplying an input data signal to said charge-coupled device so that the charge levels in each of said charge storage wells represent the magnitude of said input data signal;
   said charge-coupled device being arranged so that an input electromagnetic wave can be directed through said spatial light modulator to provide an output electromagnetic wave, the intensity of said electromagnetic wave being spatially modulated by the electric fields controlled by the charge levels in said storage wells.

2. An electro-optical device in accordance with claim 1 wherein said charge-coupled device is of the two-phase type.

3. An electro-optical device in accordance with claim 1 wherein said charge-coupled device is of the three-phase type.

4. An electro-optical device in accordance with claim 1 wherein said charge-coupled device is of the four-phase type.

5. An electro-optical device in accordance with claim 1 wherein said charge-coupled device is formed as a two-dimensional array of said electrodes.

6. An electro-optical device in accordance with claim 1 wherein said electromagnetic wave is transmitted through said charge-coupled device and is thereupon reflected from a reflective surface of said substrate for transmission back through said charge-coupled device.

7. An electro-optical device in accordance with claim 1 wherein said input data supplying means comprises optical input means responsive to an optical input signal which contains said input data for transferring said input data to said electrodes to provide the charge levels at each of said charge storage wells which represent the magnitude of said input data.

8. An electro-optical device in accordance with claim 7 wherein said optical input means comprises means for optically imaging said input data on said electrodes.

9. An electro-optical device in accordance with claim 7 wherein said optical input means comprises means for providing a time-modulated optical beam and means for scanning said electrodes with said time-modulated optical beam.

10. An electro-optical device in accordance with claim 1 wherein said electromagnetic wave is directed in a direction substantially parallel to the plane of said electrodes and further including means for guiding said electromagnetic wave so as to transmit said signal through the storage wells of said charge-coupled device.

11. An electro-optical device in accordance with claim 10 wherein said guiding means comprises an intermediate layer of a selected material positioned between the layer at said selected surface and the bulk of said substrate below said layer.

12. An electro-optical device in accordance with claim 11 wherein the layer at said selected surface is formed of n-type gallium arsenide and said intermediate layer is formed of semi-insulating aluminum gallium arsenide.

13. An electro-optical system in accordance with claim 1 wherein
   said input data supplying means includes means for applying said input data signal to the plurality of electrodes of the charge-coupled device of said spatial light modulator; and further including
   means for applying an electromagnetic wave to said spatial light modulator to produce an electromagnetic wave output therefrom which is intensity modulated by the electric fields controlled by the charge levels in said storage wells;

lens means positioned adjacent said spatial light modulator at a distance equal to the focal length of said lens means and responsive to said intensity modulated electromagnetic wave output for focussing said intensity modulated electromagnetic wave output at the focal plane of said lens means;

detector means positioned adjacent said lens means at said focal plane and responsive to said intensity modulated electromagnetic wave output focussed thereat for detecting said intensity modulated electromagnetic wave output to produce the Fourier transform of said input signal.

14. An electro-optical system in accordance with claim 13 wherein said charge-coupled device is formed as a two-dimensional array of said electrodes; and said electromagnetic wave is applied as a two-dimensional wave.

15. An electro-optical system in accordance with claims 13 or 14 wherein said electromagnetic wave is directed onto the plane of said electrodes in a direction substantially perpendicular thereto.

16. An electro-optical system in accordance with claim 13 wherein said charge-coupled device is formed as a one-dimensional row of said electrodes; and said electromagnetic wave is applied as a one-dimensional wave.

17. An electro-optical system in accordance with claim 16 wherein said one-dimensional electromagnetic wave is applied in a direction substantially parallel to the plane of said electrodes and said electro-optical system further includes means for guiding said electromagnetic wave through the storage wells of said charge-coupled device.

18. An electro-optical system comprising first and second spatial light modulators, each in accordance with claim 1, positioned adjacent each other;

first means for applying a first input data signal to the plurality of electrodes of the charge-coupled device of said first spatial light modulator;

second means for applying a reference data signal to the plurality of electrodes of the charge-coupled device of said second spatial light modulator;

means for applying an electromagnetic wave to said first spatial light modulator to produce a first electromagnetic wave signal output therefrom which is intensity modulated by said first input data signal in accordance with the electric fields controlled by the charge levels in the storage wells of said first spatial light modulator;

said intensity modulated electromagnetic wave signal being applied to said second spatial light modulator to produce a second electromagnetic wave signal output therefrom which is further intensity modulated by said reference data signal in accordance with the electric fields controlled by the charge levels in the storage wells of said second spatial light modulator;

lens means positioned adjacent said second spatial light modulator and responsive to said further intensity modulated electromagnetic wave for focussing said further intensity modulated electromagnetic wave at the focal plane of said lens means;

detector means positioned adjacent said lens means at said focal length and responsive to said further intensity modulated electromagnetic wave for detecting said further intensity modulated wave signal to produce an output signal which represents a correlation of said first input data signal and said reference data signal when the positions of said latter signals in said charge-coupled devices shift relative to each other.

19. An electro-optical system in accordance with claim 18 wherein the charge-coupled devices of said first and said second spatial light modulators are each formed as a two-dimensional array of said electrodes and the electromagnetic waves applied thereto are applied as two-dimensional waves.

20. An electro-optical system in accordance with claims 18 or 19 wherein the electromagnetic waves applied to said first and said second spatial light modulators are directed onto the planes of the electrodes thereof in directions substantially perpendicular thereto.

21. An electro-optical system in accordance with claim 18 wherein the charge-coupled devices of said first and said second spatial light modulators are formed as a one-dimensional row of the electrodes thereof and the electromagnetic waves are applied thereto in directions which are substantially parallel to the planes of said electrodes.

22. An electro-optical system in accordance with claim 21 wherein each of said first and second spatial light modulators includes means for guiding the electromagnetic waves applied thereto through the storage wells of the charge-coupled devices formed therein.

23. An electro-optical system comprising a first spatial light modulator in accordance with claim 1 wherein said input data supplying means includes means for applying said input data signal to the plurality of electrodes of the charge-coupled device of said first spatial light modulator;

and further including means for applying an electromagnetic wave to said first spatial light modulator to produce a first electromagnetic wave output therefrom which is intensity modulated by said input data signal in accordance with the electric fields controlled by the charge levels in the storage wells of said first spatial light modulator;

first lens means positioned adjacent said first spatial light modulator and responsive to said first modulated electromagnetic wave output for focusing said wave output at the focal plane of said first lens means;

a second spatial light modulator in accordance with claim 1 positioned at said focal plane;

means for applying a reference data signal to the plurality of electrodes of the charge-coupled device of said second spatial light modulator said second spatial light modulator being responsive to the focussed wave output from said first lens means to produce a second electromagnetic wave output which is further intensity modulated by said reference data signal in accordance with the electric fields controlled by the charge levels in the storage wells of said second spatial light modulator;

second lens means positioned adjacent said second spatial light modulator and responsive to said further intensity modulated electromagnetic wave output for focussing said wave output at the focal plane of said second lens means; and detector means positioned at the focal plane of said second lens means and responsive to the focussed wave output from said second lens means for detecting said focussed wave to produce a matched filter output signal from said system.

24. An electro-optical system in accordance with claim 23 wherein the charge-coupled devices of said first and second spatial light modulators are formed as two-dimensional arrays of said electrodes and the electromagnetic waves applied thereto are applied as two-dimensional waves.

25. An electro-optical system in accordance with claims 23 or 24 wherein the electromagnetic waves applied to said first and said second spatial light modulators are directed onto the planes of the electrodes thereof in directions substantially perpendicular thereto.

26. An electro-optical system in accordance with claim 23 wherein the charge-coupled systems of said first and said second spatial light modulators are formed as a one-dimensional row of the electrodes thereof and the electromagnetic waves are applied thereto in directions which are parallel to the planes of said electrodes.

27. An electro-optical system in accordance with claim 26 wherein each of said first and said second spatial light modulators includes means for guiding the electromagnetic waves applied thereto through the storage wells of the charge-coupled devices formed therein.

28. An electro-optical system in accordance with claim 1 wherein said input electro-magnetic wave is time modulated by an input modulation signal and a reference data signal is supplied as the input data signal to said charge-coupled device, said system further including detector means positioned adjacent said spatial light modulator and responsive to the combined spatial and temporal modulation of the input electromagnetic wave for providing a time integrated correlation of the input modulation signal and the reference data signal.

29. An electro-optical system in accordance with claim 28 wherein said charge-coupled device is formed as a one-dimensional row of said electrodes.

30. An electro-optical system in accordance with claims 28 or 29 wherein the time-modulated input electromagnetic wave is directed onto the plane of the electrodes of said charge-coupled device in a direction substantially perpendicular thereto.

31. An electro-optical system in accordance with claims 28 or 29 wherein the time-modulated input electromagnetic wave is applied in a direction substantially parallel to the plane of the electrodes of said charge-coupled device and said electro-optical system further includes means for guiding said time-modulated input electromagnetic wave through the storage wells of said charge-coupled device.

32. An electro-optical system in accordance with claim 18 wherein the spatial modulation by said electric fields is in accordance with the Franz-Keldysh electroabsorption effect.

33. An electro-optical system in accordance with claim 23 wherein the spatial modulation by said electric fields is in accordance with the Franz-Keldysh electroabsorption effect.

34. An electro-optical system in accordance with claim 1 wherein the spatial modulation by said electric fields is in accordance with the Franz-Keldysh electroabsorption effect.

* * * * *